(12) United States Patent
Kim et al.

(10) Patent No.: US 11,188,708 B2
(45) Date of Patent: Nov. 30, 2021

(54) ELECTRONIC DEVICE, METHOD, AND COMPUTER READABLE MEDIUM FOR DYNAMIC LAYOUT MESSAGE

(71) Applicant: SAMSUNG ELECTRONICS CO., LTD., Suwon-si (KR)

(72) Inventors: Daewoong Kim, Suwon-si (KR); Jaehyun Kim, Suwon-si (KR); Sungwoo Cho, Suwon-si (KR); Yunseok Hyun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 16/791,112

(22) Filed: Feb. 14, 2020

(65) Prior Publication Data

US 2020/0265181 A1 Aug. 20, 2020

(30) Foreign Application Priority Data

Feb. 15, 2019 (KR) .................. 10-2019-0017986

(51) Int. Cl.
*G06F 40/106* (2020.01)
*G06F 40/14* (2020.01)
*H04L 12/58* (2006.01)

(52) U.S. Cl.
CPC .......... *G06F 40/106* (2020.01); *G06F 40/14* (2020.01); *H04L 51/02* (2013.01)

(58) Field of Classification Search
None
See application file for complete search history.

(56) References Cited

U.S. PATENT DOCUMENTS

| 7,519,720 B2 | 4/2009 | Fishman et al. |
| 9,602,557 B2 * | 3/2017 | Good ............... H04L 65/608 |

(Continued)

FOREIGN PATENT DOCUMENTS

| EP | 3 389 230 | 10/2018 |
| KR | 10-2008-0078108 | 8/2008 |

(Continued)

OTHER PUBLICATIONS

GSMA, RCS Universal Profile Service Definition Document Version 2.2, GSM Association, May 16, 2018 (Year: 2018).*

(Continued)

*Primary Examiner* — Howard Cortes
(74) *Attorney, Agent, or Firm* — Nixon & Vanderhye P.C.

(57) ABSTRACT

An electronic device according to various embodiments includes a communication circuit, a touch screen, at least one memory storing an application supporting an RCS, and at least one processor. The at least one processor is configured to control the electronic device to: receive an RCS message from an external device through the communication circuit using the application; identify whether the RCS message is a first type or a second type based on data included in a header of the RCS message; identify a first layout object from the RCS message based on identifying that the message is the first type; identify whether each of second objects under the first layout object is a content object or a layout object indicating relative positions of a plurality of contents provided by the content object to be displayed on the touch screen; and display the plurality of contents based on the relative positions.

20 Claims, 10 Drawing Sheets

(56) References Cited

U.S. PATENT DOCUMENTS

| | | | |
|---|---|---|---|
| 10,187,337 B2 | 1/2019 | Smullen et al. | |
| 2003/0131142 A1 | 7/2003 | Horvitz et al. | |
| 2008/0132215 A1* | 6/2008 | Soderstrom | H04L 67/14 |
| | | | 455/416 |
| 2014/0032683 A1* | 1/2014 | Maheshwari | H04L 29/06408 |
| | | | 709/206 |
| 2014/0243028 A1 | 8/2014 | Columbo et al. | |
| 2014/0250393 A1 | 9/2014 | Goodson | |
| 2014/0372557 A1 | 12/2014 | Buckley et al. | |
| 2016/0048307 A1 | 2/2016 | Troyer et al. | |
| 2018/0192364 A1* | 7/2018 | Campos | H04W 48/18 |
| 2020/0128453 A1* | 4/2020 | Teyeb | H04W 36/0069 |
| 2020/0236105 A1* | 7/2020 | Doshi | H04L 63/0884 |

FOREIGN PATENT DOCUMENTS

| | | |
|---|---|---|
| KR | 10-2016-0094212 | 8/2016 |
| KR | 10-1945897 | 2/2019 |

OTHER PUBLICATIONS

International Search Report and Written Opinion dated Jun. 9, 2020 in counterpart International Application No. PCT/KR2020/002144.
Search Report and Written Opinion dated Jun. 9, 2020 in counterpart European Application No. EP20157483.7.

* cited by examiner

ELECTRONIC DEVICE, METHOD, AND COMPUTER READABLE MEDIUM FOR DYNAMIC LAYOUT MESSAGE

CROSS-REFERENCE TO RELATED APPLICATION

This application is based on and claims priority under 35 U.S.C. § 119 to Korean Patent Application No. 10-2019-0017986, filed on Feb. 15, 2019, in the Korean Intellectual Property Office, the disclosure of which is incorporated by reference herein in its entirety.

BACKGROUND

Field

The disclosure relates to messages which are transmitted or received using communication. For example, various embodiments relate to an electronic device, a method, and a computer readable medium for a dynamic layout message.

Description of Related Art

The rich communication service (RCS) refers to a protocol among a mobile operator, an original equipment manufacturer (OEM), and an operating system (OS) provider. Setting of standards for providing the RCS in an electronic device is being made among the mobile operator, the OEM, and the OS provider.

An RCS message displays contents in a pre-defined arrangement unlike a message of an instant messaging service.

The above information is presented as background information only to assist with an understanding of the disclosure. No determination has been made, and no assertion is made, as to whether any of the above might be applicable as prior art with regard to the disclosure.

SUMMARY

An electronic device according to various example embodiments may include a communication circuit, a touch screen, at least one memory storing an application supporting a rich communication service (RCS), and at least one processor. The at least one processor may be configured to control the electronic device to: receive an RCS message from an external device through the communication circuit using the application; identify whether the RCS message is a first type or a second type based on data included in a header of the RCS message; identify a first layout object from the RCS message based on identifying that the message is of the first type; identify whether each of second objects under the first layout object is a content object or a layout object indicating relative positions of a plurality of contents provided by the content object to be displayed on the touch screen; and display the plurality of contents based on the relative positions identified based on the layout object.

An electronic device according to various example embodiments may include a communication circuit, a display, at least one memory storing instructions and an application supporting an RCS, and at least one processor. The at least one processor may be configured to execute the instructions to control the electronic device to: receive an RCS message from an external device through the communication circuit using the application, identify that the RCS message is a first type based on data included in a header of the RCS message, identify a first layout object from the RCS message based on the identification, and, based on the identification of the first layout object, determine whether each of second objects under the first layout object is a content object used to provide each of a plurality of contents in a user interface of the application using the display or a layout object indicating relative positions of the plurality of contents.

An electronic device according to various example embodiments may include a memory storing instructions, a communication circuit, and at least one processor. The at least one processor may be configured to execute the instructions to control the electronic device to: obtain an RCS message including a first layout object, content objects under the first layout object, a second layout object under the first layout object, and other content objects under the second layout object; and transmit the obtained RCS message to an external device through the communication circuit. The first layout object may be used to determine relative positions of the content objects, the second layout object may be used to determine relative positions of the other content objects, and each of the content objects and the other content objects may be used to provide a plurality of contents of the RCS message.

A non-transitory computer readable storage medium according to various example embodiments may store one or more programs including instructions which, when executed by one or more processors of an electronic device, the electronic device including a communication circuit, a display, at least one memory storing the instructions and an application supporting an RCS, cause the electronic device to control the electronic device to control the electronic device to: receive an RCS message from an external device through the communication circuit using the application, identify that the RCS message is a first type based on data included in a header of the RCS message, identify a first layout object from the RCS message based on the identification, and, based on the identification of the first layout object, determine whether each of second objects under the first layout object is a content object used to provide each of a plurality of contents in a user interface of the application using the display or a layout object indicating relative positions of the plurality of contents.

A non-transitory computer readable storage medium according to various example embodiments may store one or more programs including instructions. When being executed by one or more processors of an electronic device, the electronic device including a communication circuit, the instructions may cause the electronic device to: obtain an RCS message including a first layout object, content objects under the first layout object, a second layout object under the first layout object, and other content objects under the second layout object; and transmit the obtained RCS message to an external device through the communication circuit. The first layout object may be used to determine relative positions of the content objects, the second layout object may be used to determine relative positions of the other content objects, and each of the content objects and the other content objects may be used to provide a plurality of contents of the RCS message.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
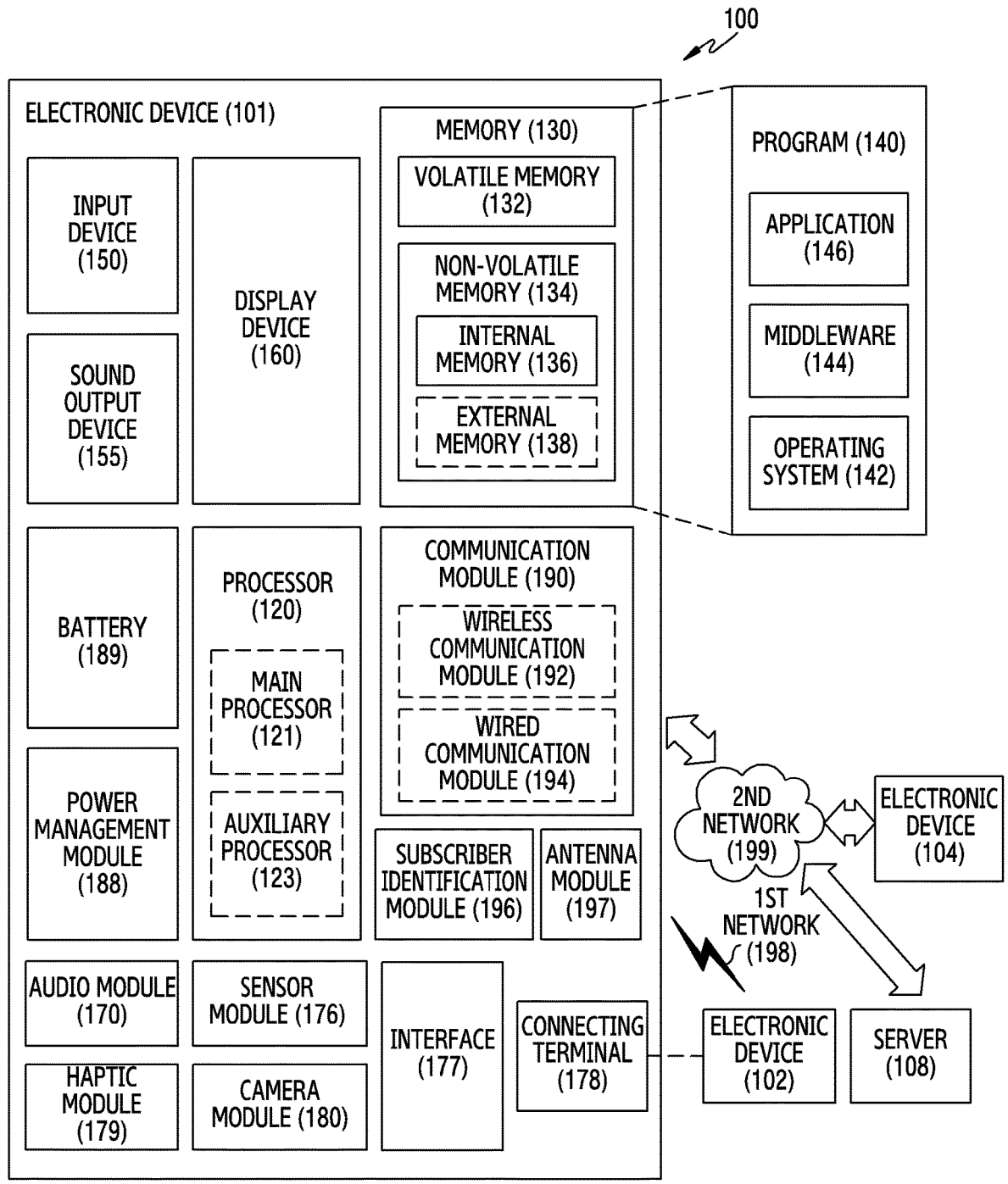
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
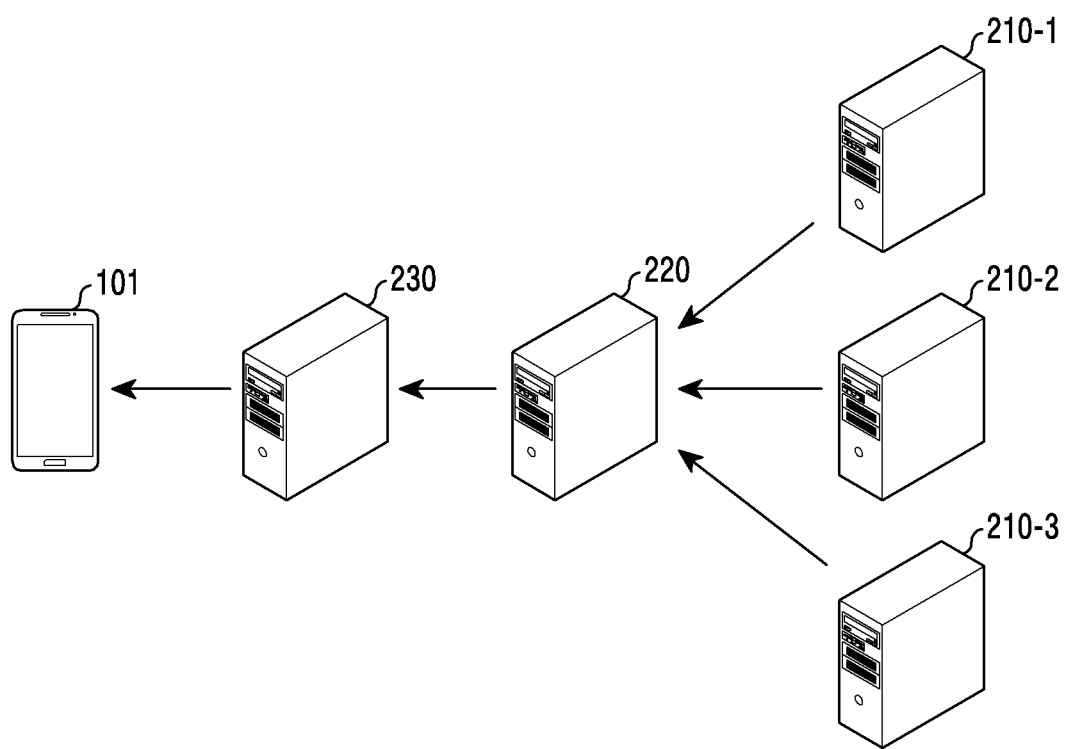
FIG. 2 is a diagram illustrating an example of a system environment including an electronic device according to various embodiments.

FIG. 2 is a diagram illustrating an example system environment including an electronic device according to various embodiments. The environment may include the electronic device 101 shown in FIG. 1.

Referring to FIG. 2, the environment 200 may include the electronic device 101, a plurality of first servers 210-1, 210-2 and 210-3, a second server 220, and a third server 230.

In various embodiments, each of the plurality of first servers 210-1, 210-2 and 210-3 (which may be referred to hereinafter as 210-1 to 210-3) may obtain or create an RCS message of a rich card format which may, for example, indicated by the Javascript object notation (JSON) grammar. For example, each of the plurality of first servers 210-1 to 210-3 may obtain or create the RCS message to provide a chatbot service. In various embodiments, the RCS message may be obtained or created by a rich card creation module of each of the plurality of first servers 210-1 to 210-3. A structure of the RCS message according to various embodiments will be described in greater below with reference to FIGS. 3, 4, 5, 6, 7, 8 and 9. For example, each of the plurality of first servers 210-1 to 210-3 may be a chatbot server of a service provider. In various embodiments, each of the plurality of first servers 210-1 to 210-3 may transmit the RCS message to the second server 220 to provide the obtained or created RCS message to the electronic device 101. The RCS message may be transmitted to the second server 220 through a communication circuit of each of the plurality of first servers 210-1 to 210-3.

In various embodiments, the second server 220 may receive the RCS message. In various embodiments, the second server 220 may validate the RCS message. For example, the second server 220 may be a chatbot platform server. In various embodiments, the second server 220 may transmit the validated RCS message to the third server 230. The validated RCS message may be transmitted to the third server 230 through a communication circuit of the second server 220.

In various embodiments, the third server 230 may receive the RCS message. In various embodiments, the third server 230 may process the RCS message to conform to the electronic device 101. For example, the third server 230 may be an RCS messaging server of a mobile operator. In various embodiments, the third server 230 may transmit the processed RCS message to the electronic device 101.

In various embodiments, the electronic device 101 may receive the RCS message. In various embodiments, the electronic device 101 may display information regarding the RCS message through a display (for example, the display device 160) of the electronic device 101. In various embodiments, the electronic device 101 may display contents of the RCS message using content objects included in the RCS message. A method for displaying the RCS message on the display of the electronic device 101 according to various embodiments will be described in greater detail below with reference to FIGS. 3, 4, 5, 6, 7, 8 and 9. In various embodiments, the RCS message displayed through the display device 160 may be configured with a dynamic layout. In various embodiments, the RCS message received at the electronic device 101 may include layout objects. Therefore, the contents of the RCS message displayed through the display device 160 may have one arrangement of various arrangements distinct from pre-defined arrangements. In various embodiments, since the RCS message may be configured with various arrangements distinct from pre-defined arrangements, the RCS message may be referred to, for example, as open rich card data.

An electronic device according to various example embodiments may include a communication circuit, a touch screen, at least one memory storing an application supporting an RCS, and at least one processor. The at least one processor may be configured to control the electronic device to: receive an RCS message from an external device through the communication circuit using the application; identify whether the RCS message is a first type or a second type based on data included in a header of the RCS message; identify a first layout object from the RCS message based on identifying that the message is the first type; identify whether each of second objects under the first layout object is a content object or a layout object indicating relative positions of a plurality of contents provided by the content object to be displayed on the touch screen; and display the plurality of contents based on the relative positions identified based on the layout object.

An electronic device according to various example embodiments may include a communication circuit, a display, at least one memory storing instructions and an application supporting an RCS, and at least one processor. The at least one processor may be configured to execute the instructions to control the electronic device to: receive an RCS message from an external device through the communication circuit using the application, identify that the RCS message is a first type based on data included in a header of the RCS message, identify a first layout object from the RCS message based on the identification, and, based on the identification of the first layout object, determine whether each of second objects under the first layout object is a content object used to provide each of a plurality of contents in a user interface of the application using the display or a layout object indicating relative positions of the plurality of contents.

In various example embodiments, the at least one processor may further be configured to execute the instructions to control the electronic device to display the plurality of contents arranged based at least on the relative positions in the user interface using the display in response to the determination In various example embodiments, the at least one processor may be configured to execute the instructions to control the electronic device to display the plurality of contents horizontally or vertically based at least on the relative positions.

In various example embodiments, the at least one processor may further be configured to execute the instructions to control the electronic device to: identify that the RCS message is the message of the second type based on the data included in the header of the RCS message, and display the contents of the RCS message in the user interface in a pre-defined structure based identifying that the RCS message is the message of the second type.

In various example embodiments, the at least one processor may be configured to execute the instructions to control the electronic device to identify that the RCS message is the message of the first type based on a field of a content type in the data in the header.

In various example embodiments, the message of the first type may include data configured with a tree structure in a payload.

In various example embodiments, the external device may include a chatbot server.

An electronic device according to various example embodiments may include a memory storing instructions, a communication circuit, and at least one processor. The at least one processor may be configured to execute the instructions to control the electronic device to: obtain an RCS message including a first layout object, content objects under the first layout object, a second layout object under the first layout object, and other content objects under the second layout object; and transmit the obtained RCS message to an external device through the communication circuit. The first layout object may be used to determine relative positions of the content objects, the second layout object may be used to determine relative positions of the other content objects, and each of the content objects and the other content objects may be used to provide a plurality of contents of the RCS message.

In various example embodiments, the RCS message may further include a header including data indicating that the RCS message is a message of a first type.

In various example embodiments, the first layout object may be used to display contents provided by the content objects horizontally or vertically in the external device.

In various example embodiments, the relative positions of the content objects may be determined by a field of an orientation of the first layout object, and the relative positions of the other content objects may be determined by a field of an orientation of the second layout object.

In various example embodiments, the RCS message may be transmitted to the external electronic device through an RCS messaging server.

In various example embodiments, the first layout object, the content objects, the second layout object, and the other content objects may be included in a payload in the RCS message.

In various example embodiments, the content object may be configured with a text view or an image view.

Figure 3:
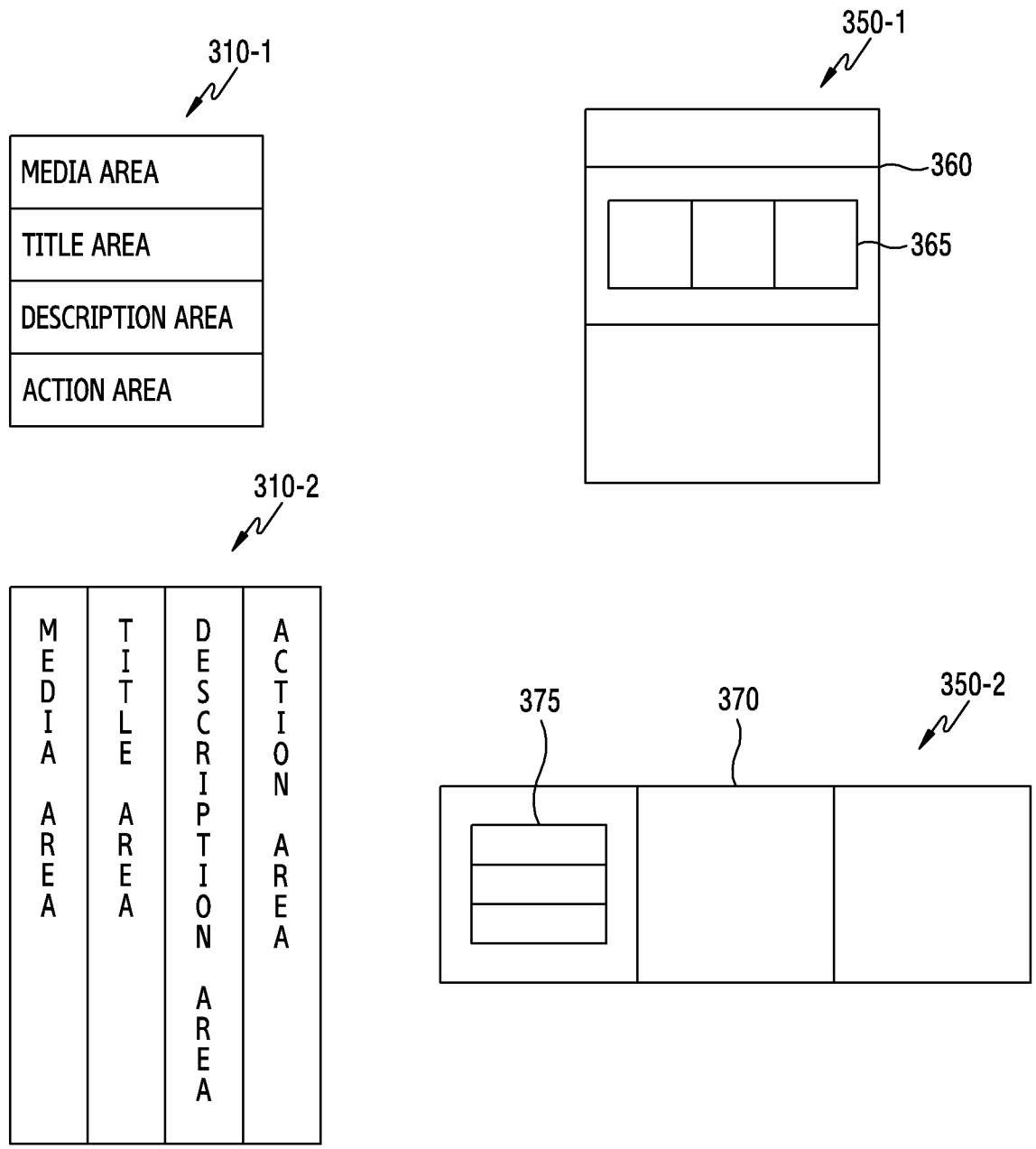
FIG. 3 is a diagram illustrating examples of structures of an RCS message according to various embodiments.

FIG. 3 is a diagram illustrating example structures of an RCS message according to various embodiments. The RCS message may be transmitted from each of the plurality of first servers shown in FIG. 2, and may be received at the electronic device 101 shown in FIG. 1 or 2.

Referring to FIG. 3, each of a structure 310-1 and a structure 310-2 may be a structure of a rich communication service (RCS) message having a pre-defined arrangement. For example, in the structure 310-1, the RCS message having the pre-defined arrangement may display a media area, a title area, a description area, and an action area including an executable object vertically on a display (for example, the display device 160) of the electronic device 101 in order of the media area, the title area, the description area, and the action area. In another example, in the structure 310-2, the RCS message having the pre-defined arrangement may display the media area, the title area, the description area, and the action area horizontally on the display of the electronic device 101 in order of the media area, the title area, the description area, and the action area. The RCS message having the pre-defined arrangement may have a limit to displaying contents in other structures distinct from the structure 310-1 or the structure 310-2. For example, the RCS message displaying contents in the structure 310-1 or the structure 310-2 may be a message of a second type distinct from a message of a first type which will be described in greater detail below. For example, the RCS message displaying contents in the structure 310-1 or the structure 310-2 may include information "application/vnd.gsma.botmessage.v1.0+json" within a field of a content type of data within a header of the RCS message to indicate that the RCS message is the message of the second type.

Each of a structure 350-1 and a structure 350-2 may be an example of a structure of an RCS message according to various embodiments. The RCS message according to various embodiments may include a layout object and other layout object(s) which may be a child or children of the layout object. Therefore, the RCS message according to various embodiments may display contents in various arrangements unlike the RCS message having the pre-defined arrangement. For example, in the structure 350-1, the RCS message according to various embodiments may include a horizontal layout 365 to arrange at least one other content within a vertical layout 360 for arranging at least one content. Therefore, the RCS message according to various embodiments may display contents in various arrangements unlike the RCS message having the pre-defined arrangement. In another example, in the structure 350-2, the RCS message according to various embodiments may include a vertical layout 375 to arrange at least one other content within a horizontal layout 370 for arranging at least one content. Therefore, the RCS message according to various embodiments may display contents in various arrangements unlike the RCS message having the pre-defined arrangement. The RCS message according to various embodiments may include data of a hierarchical structure which is configured with layout objects and content objects. Therefore, the contents of the RCS message may be displayed in various structures in addition to the structure 350-1 and the structure 350-2. For example, the RCS message displaying the contents in the structure 350-1 or the structure 350-2 may be the message of the first type distinct from the message of the second type. For example, the RCS message displaying the contents in the structure 350-1 or the structure 350-2 may include information "application/vnd.gsma.openrichcard+json" within a field of a content type of data within a header of the RCS message to indicate that the RCS message is the message of the first type.

Figure 4:
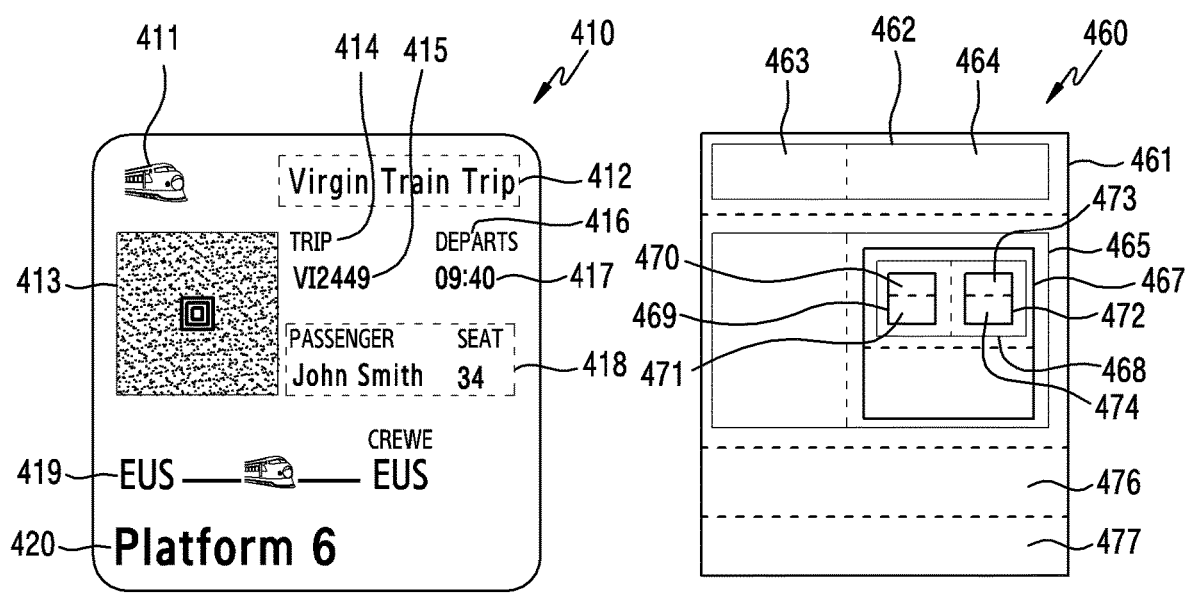
FIG. 4 is a diagram illustrating examples of contents of an RCS message displayed in an electronic device according to various embodiments.

FIG. 4 is a diagram illustrating examples contents of an RCS message displayed in an electronic device according to various embodiments. The contents of the RCS message may be displayed on the electronic device 101 shown in FIG. 1 or 2, and the RCS message may be obtained by each of the plurality of first servers 210-1 to 210-3 shown in FIG. 2.

Figure 5:
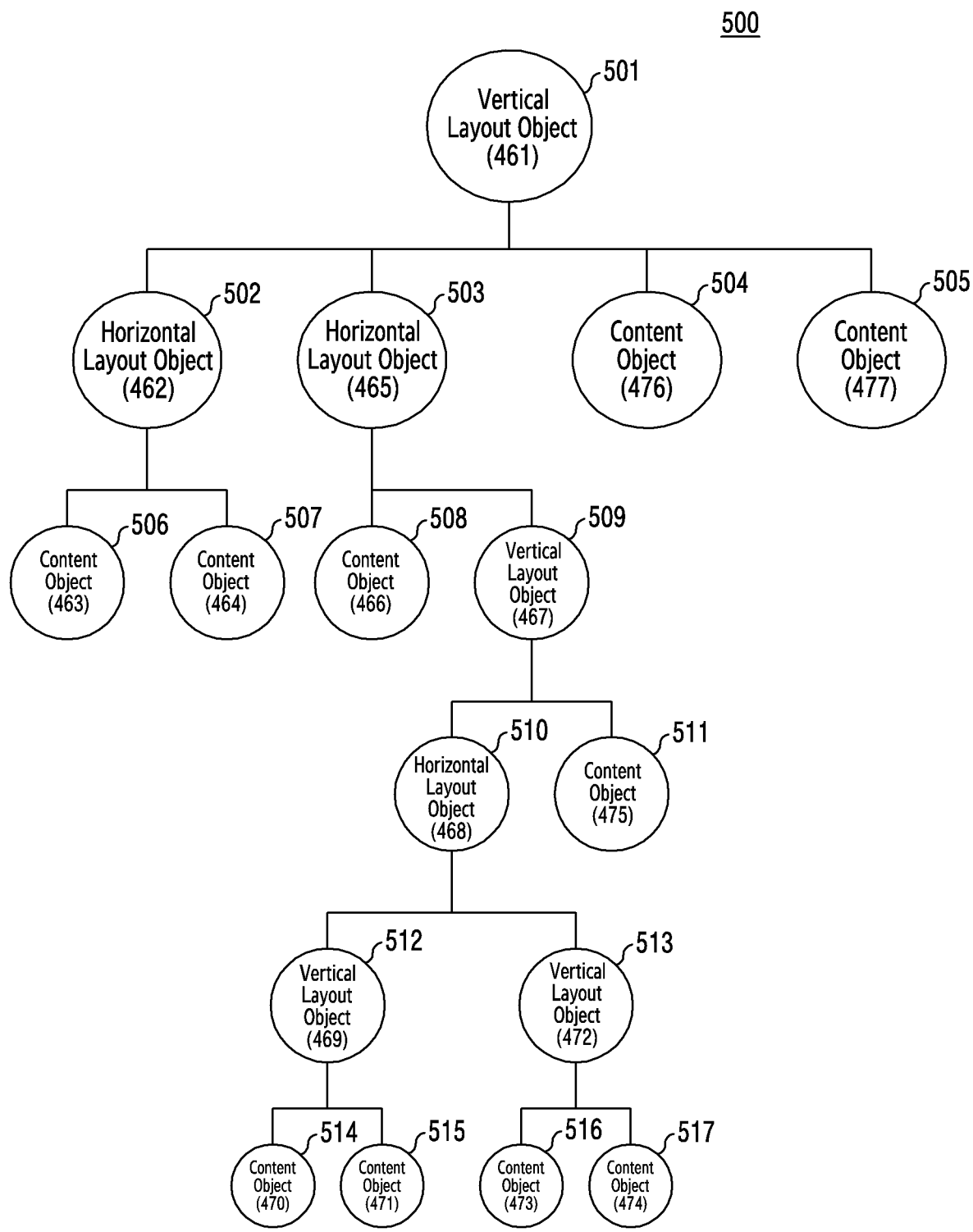
FIG. 5 is a diagram illustrating an example tree structure of an RCS message according to various embodiments.

FIG. 5 is a diagram illustrating an example tree structure of an RCS message according to various embodiments.

Referring to FIGS. 4 and 5, the processor 120 of the electronic device 101 which receives an RCS message from an external device (for example, one server of the plurality of first servers 210-1 to 210-3) through a communication circuit (for example, the communication module 190) may identify that the RCS message is the message of the first type based on data within the header of the RCS message. The processor 120 may display contents 410 through a display (for example, the display device 160) based at least in part on the identification. The contents 410 may be displayed on the display based on the RCS message including information regarding a structure 460. For example, the RCS message may include a first node 501 which is a vertical layout object 461. In the description, a node such as the $1^{st}$ node 501 to $17^{th}$ node 517 shown in FIG. 5 may be a term for defining a relationship between a content object and a layout object. The vertical layout object 461 may determine arrangements of a $2^{nd}$ node 502, a $3^{rd}$ node 503, a $4^{th}$ node 504, and a $5^{th}$ node 505 which are children nodes of the $1^{st}$ node 501 and are included in the RCS message.

For example, the 2nd node 502 may be a horizontal layout object 462. The horizontal layout object 462 may determine arrangements of a $6^{th}$ node 506 and a $7^{th}$ node 507 which are children nodes of the $2^{nd}$ node 502 and are included in the RCS message. The $6^{th}$ node 506 may be a content object 463. The content object 463 may be used to display an image 411 included in the contents 410. The image 411 may be an executable object. The $7^{th}$ node 507 may be a content object 464. The content object 464 may be used to display a text 412 included in the contents 410.

For example, the $3^{rd}$ node 503 may be a horizontal layout object 465. The horizontal layout object 465 may determine arrangements of an $8^{th}$ node 508 and a $9^{th}$ node 509 which are children nodes of the $3^{rd}$ node 503 and are included in the RCS message. The $8^{th}$ node 508 may be a content object 466. The content object 466 may be used to display an image 413 included in the contents 410. The image 413 may be used as a bar code or a quick response (QR) code, and may be an executable object. The $9^{th}$ node 509 may be a vertical layout object 467. The vertical layout object 467 may determine arrangements of a $10^{th}$ node 510 and an $11^{th}$ node 511 which are children nodes of the $9^{th}$ node 509 and are included in the RCS message. The $10^{th}$ node 510 may be a horizontal layout object 468. The horizontal layout object 468 may determine arrangements of a $12^{th}$ node 512 and a $13^{th}$ node 513 which are children nodes of the $10^{th}$ node 510 and are included in the RCS message. The $12^{th}$ node 512 may be a vertical layout object 469. The vertical layout object 469 may determine arrangements of a $14^{th}$ node 514 and a $15^{th}$ node 515 which are children nodes of the $12^{th}$ node 512 and are included in the RCS message. The $14^{th}$ node 514 may be a content object 470. The content object 470 may be used to display a text 414 included in the contents 410. The $15^{th}$ node 515 may be a content object 471. The content object 471 may be used to display a text 415 included in the contents 410. The $13^{th}$ node 513 may be a vertical layout object 472. The vertical layout object 472 may determine arrangements of a $16^{th}$ node 516 and a $17^{th}$ node 517. The 16th node 516 may be a content object 473. The content object 473 may be used to display a text 416 included in the contents 410. The 17th node 517 may be a content object 474. The content object 474 may be used to display a text 417 included in the contents 410. The 11th node 511 may be a content object 475. The content object 475 may be used to display a text 418 included in the contents 410.

For example, the 4th node 504 may be a content object 476. The content object 476 may be used to display an image 419 included in the contents 410. The image 419 may be an executable object.

For example, the 5th node 505 may be a content object 477. The content object 477 may be used to display a text 420 included in the contents 410.

In various embodiments, the RCS message for displaying the contents 410 includes information as illustrated by way of example in Table 1 below, thereby implementing the structure 460 (or the tree structure 500):

TABLE 1

```
{
  "card": "open_rich_card",
  "version": "1.0.0",
  "layout": {
    "widget": "LinearLayout",
    "width": "content",
    "height": "content",
    "background": "#FFFFFF",
    "orientation": "vertical",
    "padding": "5dp",
    "children": [
      {
        "widget": "LinearLayout",
        "width": "parent",
        "height": "content",
        "gravity": "center_vertical",
        "orientation": "horizontal",
        "children": [
          {
            "widget": "ImageView",
            "width": "45dp",
            "height": "30dp",
            "marginLeft": "5dp",
            "scaleType": "centerCrop",
            "mediaUrl": "@drawable/ic_train"
          },
          {
            "widget": "TextView",
            "width": "content",
            "height": "content",
            "weight": "1",
            "text": "Virgin Train Trip",
            "textColor": "#79A2CA",
            "textSize": "18dp"
          }
        ]
      }
      ...
      ...
```

As shown in table 1, the RCS message may be configured with a rich card format indicated by the JSON grammar.

As shown in table 1, the RCS message which is the message of the first type may include a field (for example, "card": "open_rich_card") for indicating that the RCS message is an open rich card, a field (for example, "version": "1.0.0") for indicating a version of the open rich card, and a field (for example, "layout": {omit}) for indicating details of the open rich card. The field for indicating details of the open rich card may be defined as an object in the description. The field for indicating details of the open rich card may include one of i) a layout object (for example, "widget": "linearlayout") for determining relative positions of a plurality of contents provided by the RCS message, ii) a content object (for example, "widget": "Textview") for providing a content configured with a text from among the plurality of contents, iii) a content object (for example, "widget": "ImageView") for providing a content configured with an image from among the plurality of contents, and iv) a content object (for example, "widget": "suggestions") which is a suggestion for providing various actions from the plurality of contents.

The layout object, the content objects, and the suggestion may include common information as illustrated by way of example in Table 2 below:

TABLE 2

"widget": "LinearLayout", "TextView", "ImageView", or "Suggestion"
"width": This is defined as a number of dp unit (10 dp) or "match" or "content", and indicates a width to be displayed.
dp is a size unit used in the Android OS.
match indicates a maximum size.
content is a minimum size necessary for displaying details such as text or the like, and a real display size is determined in an implementation entity.
"height": This is defined as a number of dp unit (10 dp) or "match" or "content", and indicates a height to be displayed.

The layout object may include one or more of the layout object, the content objects, or the suggestion. The layout object may further include following information illustrated by way of example in Table 3 below, unlike the content objects and the suggestion:

TABLE 3

"orientation": "vertical" or "horizontal": Included objects are arranged vertically or horizontally in the order listed.
"child": This is a JSON Array and includes one or more of LinearLayout (for example, the layout object), TextView (for example, the content object), ImageView (for example, the content object), Suggestion (for example, the suggestion).

The content object for providing the content configured with the text from among the plurality of contents may further include following information illustrated by way of example in Table 4 below:

TABLE 4

"text": This indicates a character string to be displayed on the screen (an example of a value: "This is displayed text")
"textColor": This indicates a color of a character string to be displayed on the screen. (an example of a value: "#FF445566")
"textSize": This is a number of dp unit and indicates a size of a character string to be displayed on the screen. (an example of a value: "10 dp")

The content object for providing the content configured with the image from among the plurality of contents may further include following information illustrated by way of example in Table 5 below:

TABLE 5

"mediaUrl": This is a character string of URL and indicates an image to be displayed on the screen. (an example of a value: http://cnd.-samsung.com/logo_image.jpg)

The RCS message which may, for example, be the message of the first type illustrated by way of example in tables 1, 2, 3, 4 and 5 may be defined by, for example, views and values defined as illustrated by way of example in Table 6 below. Therefore, the RCS message may have a data capacity smaller than extensible markup language (xml), may have a format similar to the legacy layout, thereby inducing a developer to be easily adapted thereto, may control loading of an internal content such as an image, etc., and may provide suggestions for performing actions.

| View Types | Attributes | Examples of values | Remarks |
|---|---|---|---|
| Common information | "width" "height" "weight" | "match" "wrap" dimen ("10dp") "1.0" (float) | required supporting only dp if parent is LinearLayout, |
| | "background" | color hex ("#FFFFFFFF") | |
| | "padding" "paddingTop" "paddingLeft" "paddingRight" "paddingBottom" "margin" "marginTop" "marginBottom" "marginLeft" "marginRight" | dimen ("10dp") | |
| LinearLayout | "widget":"LinearLayout" "orientation" | "vertical" "horizontal" | required |
| | "children" | "array" | |
| | "gravity" | "bottom" "center" "center_horizontal" "center_vertical" "clip_horizontal" "clip_vertical" "end" "fill" "fill_horizontal" "fill_vertical" "left" "right" "start" "top" | allowed to be overlaid ("bottom\|end") |
| View | "widget" | "View" | for gap, vertical line, etc. |
| TextView | "widget" "text" "textAlignment" | "TextView" String "center" "gravity" "inherit" "textEnd" "textStart" "viewEnd" "viewStart" | |
| | "textStyle" | "bold" "italic" | allowed to be overlaid ("bold\|italic") |
| | "textColor" | color hex ("#FFFFFFFF") | |
| | "textSize" | dimen ("10dp") | supporting only dp. |
| ImageView | "widget" "src" "scaleType" | "ImageView" URL (http://...) "center" "centerCrop" "centerinside" "fitCenter" "fitEnd" "fitStart" "fitXY" "matrix" | |
| Suggestions | "widget" | "Suggestions" | used instead of a button including suggestion of UP "reply", "urlAction," etc. |

As described above, a server (for example, the first server 210-1, the first server 210-2, or the first server 210-3) according to various embodiments may obtain or create the RCS message as illustrated by way of example through FIGS. 4 and 5. The electronic device 101 according to various embodiments may receive the RCS message from the server, and may display contents of the RCS message through the display. Since the RCS message includes a plurality of layout objects unlike the RCS message having the structure 310-1 or the structure 310-2, the RCS message may be used to display contents in various arrangements. Since the RCS message configured with the structure including the plurality of layout objects has the rich card format indicated by the JSON grammar, the RCS message may display contents in various arrangements without requiring change of a messaging client and a messaging server. For example, the RCS message can enhance expandability and compatibility of a service provided through a chatbot in the RCS. Since the RCS message may be used to display contents in various arrangements, the RCS message can display contents according to a size or a type of the screen of the electronic device 101, based on a driving method of the electronic device 101. For example, the RCS message can display contents in an electronic device having a relatively small display, such as a smart watch, by adjusting the structure of the RCS message. For example, since the RCS message includes executable objects such as the content object 463, the content object 466, and the content object 476, the electronic device 101 can provide a service related to the RCS message by executing a web page even when there is no application related to the content object 463, the content object 466, and the content object 476 in the electronic device.

Figure 6:
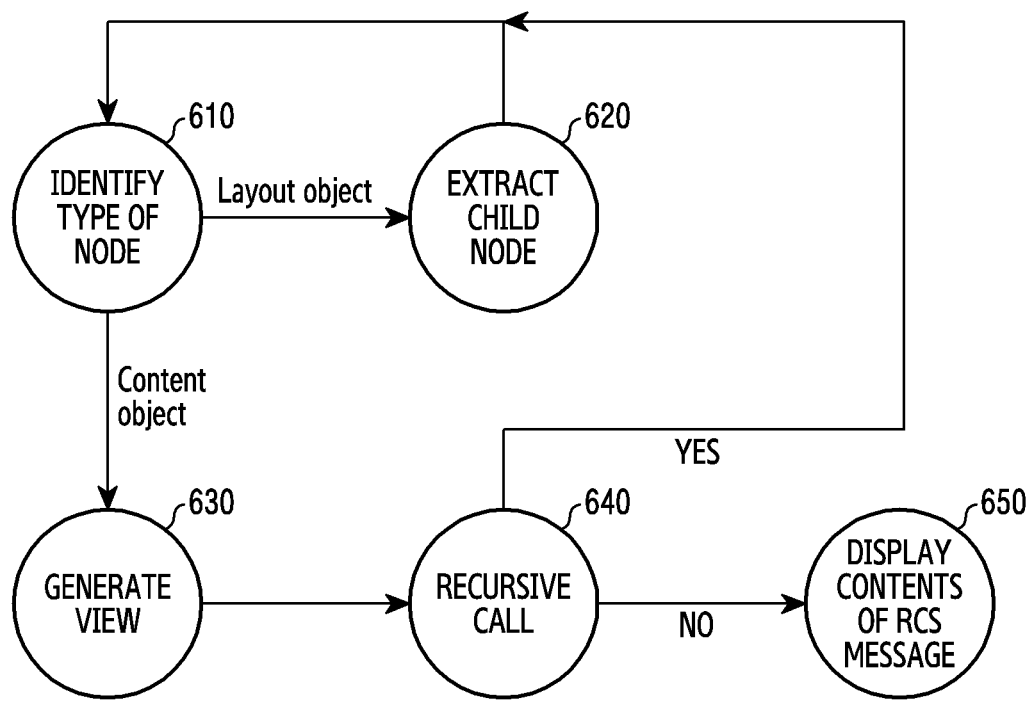
FIG. 6 is a diagram illustrating an example method for displaying contents of an RCS message received at an electronic device according to various embodiments.

FIG. 6 is a diagram illustrating an example method for displaying contents of an RCS message received at an electronic device according to various embodiments. This method may be performed by the processor 120 of the electronic device 101 shown in FIG. 1 or 2.

Referring to FIG. 6, the processor 120 may receive an RCS message from an external device (for example, the first server 210-1, the first server 210-2, or the first server 210-3) through a communication circuit (for example, the communication module 190) of the electronic device 101. In various embodiments, the processor 120 may identify that the RCS message is the message of the first type distinct from the message of the second type having the structure 310-1 or the structure 310-2 of FIG. 3, based on a content type indicated by a header of the received message. The processor 120 may interpret the RCS message by processing a payload in the RCS message received from the external device through the communication circuit, based on the identification. For example, the processor 120 may interpret the RCS message by parsing data in the payload, based on the identification. In various embodiments, the processor 120 may perform operation 610 to display contents of the RCS message (or information regarding the RCS message), based on the interpretation.

For example, in operation 610, the processor 120 may identify a type of a node included in the RCS message. For example, the processor 120 may identify whether the object included in the RCS message is a layout object for determining arrangements of at least one child node of the node or a content object configuring a part of the contents. In various embodiments, the processor 120 may perform operation 620 when the node is the layout node (e.g., the node 610 identifies the object as a content object). In various embodiment, the processor 120 may perform operation 630 when the node is the content node (e.g., the node 610 identifies the object as a layout object).

In operation 620, the processor 120 may extract at least one child node from the node. The processor 120 may perform operation 610 to identify a type of the extracted at least one child node after extracting.

In operation 630, the processor 120 may generate a view based on the content object. For example, the processor 120 may generate a view configuring a part of the contents of the RCS message by processing the content object. After generating the view, the processor 120 may perform operation 640 to identify whether operations for displaying the contents of the RCS message through the display are completed.

In operation 640, the processor 120 may identify whether there is a recursive call. In various embodiments, the processor 120 may perform operation 610 to identify a type of the next node when there is the recursive call. In various embodiments, when there is no recursive call, the processor 120 may perform operation 650 to complete the operations for displaying the contents of the RCS message through the display.

In operation 650, the processor 120 may display the contents of the RCS message (or information regarding the RCS message) through the display, based on the layout object identified in operation 610, using the views obtained in operation 630. For example, the contents of the RCS message may be displayed on a user interface of an application supporting the RCS.

Figure 7:
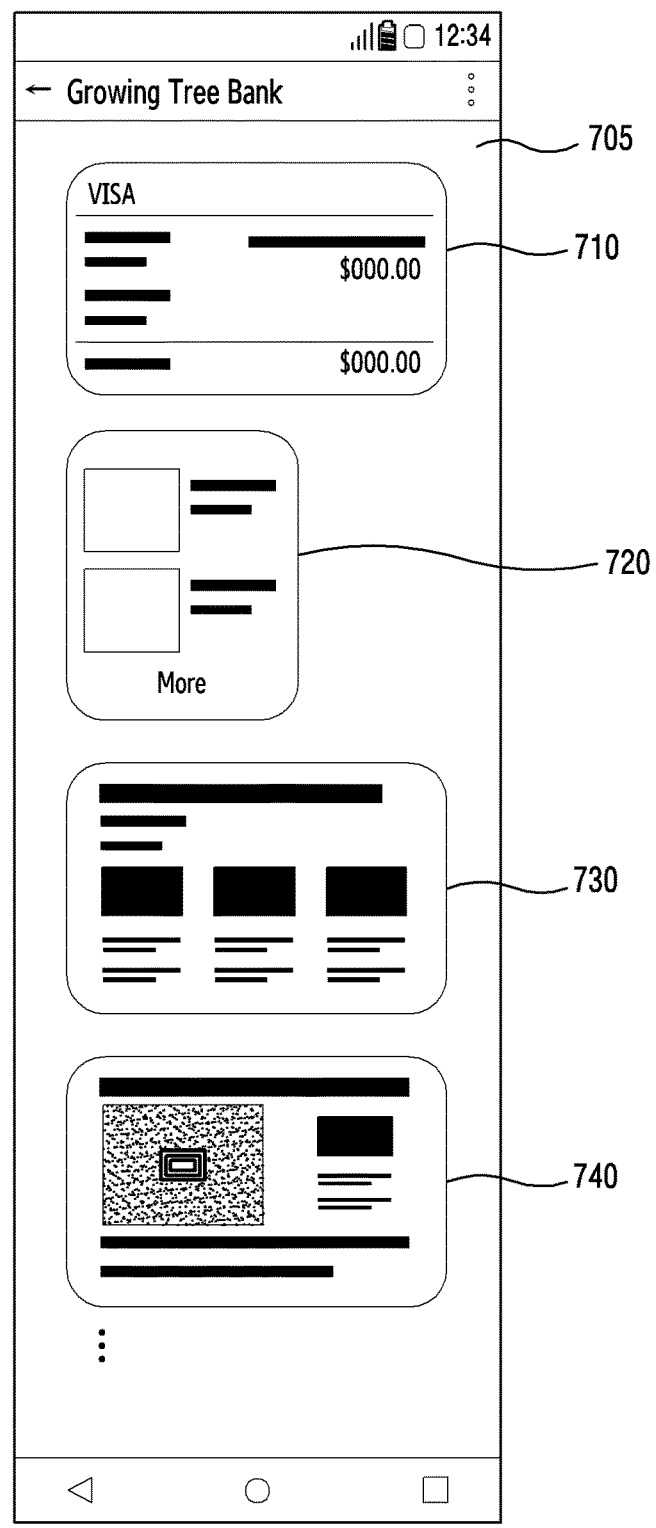
FIG. 7 is a diagram illustrating examples of contents of an RCS message displayed on a display of an electronic device according to various embodiments.

FIG. 7 is a diagram illustrating example contents of an RCS message displayed on a display of an electronic device according to various embodiments. The contents may be displayed on the display device 160 of the electronic device 101 shown in FIG. 1 or 2.

Referring to FIG. 7, the processor 120 may display a content 710 on the display device 160. In various embodiments, the content 710 may be displayed in a bubble in a user interface 705 of a message application supporting the RCS, based on a received RCS message. In various embodiments, the content 710 may be displayed based on the RCS message which includes one vertical layout object and two horizontal layout objects under the vertical layout object. However, this should not be considered as limiting.

The processor 120 may display a content 720 on the display device 160. In various embodiments, the content 720 may be displayed in a bubble in the user interface 705 of the message application supporting the RCS, based on a received RCS message. In various embodiments, the content 720 may be displayed based on the RCS message which includes one vertical layout object and two horizontal layout objects under the vertical layout object. However, this should not be considered as limiting.

The processor 120 may display a content 730 on the display device 160. In various embodiments, the content 730 may be displayed in a bubble in the user interface 705 of the message application supporting the RCS, based on a received RCS message. In various embodiments, the content 730 may be displayed based on the RCS message which includes one vertical layout object and one horizontal layout object under the vertical layout object. However, this should not be considered as limiting.

The processor 120 may display a content 740 on the display device 160. In various embodiments, the content 740 may be displayed in a bubble in the user interface 705 of the message application supporting the RCS, based on a received RCS message. In various embodiments, the content 740 may be displayed based on the RCS message which includes one vertical layout object, one horizontal layout object under the vertical layout object, and one vertical layout object under the horizontal layout object. However, this should not be considered as limiting.

As described above, the RCS message according to various embodiments can display contents in a user interface of an application layout supporting the RCS in various arrangements, using attributes of layout objects as shown in the various examples illustrated in FIG. 7.

Figure 8:
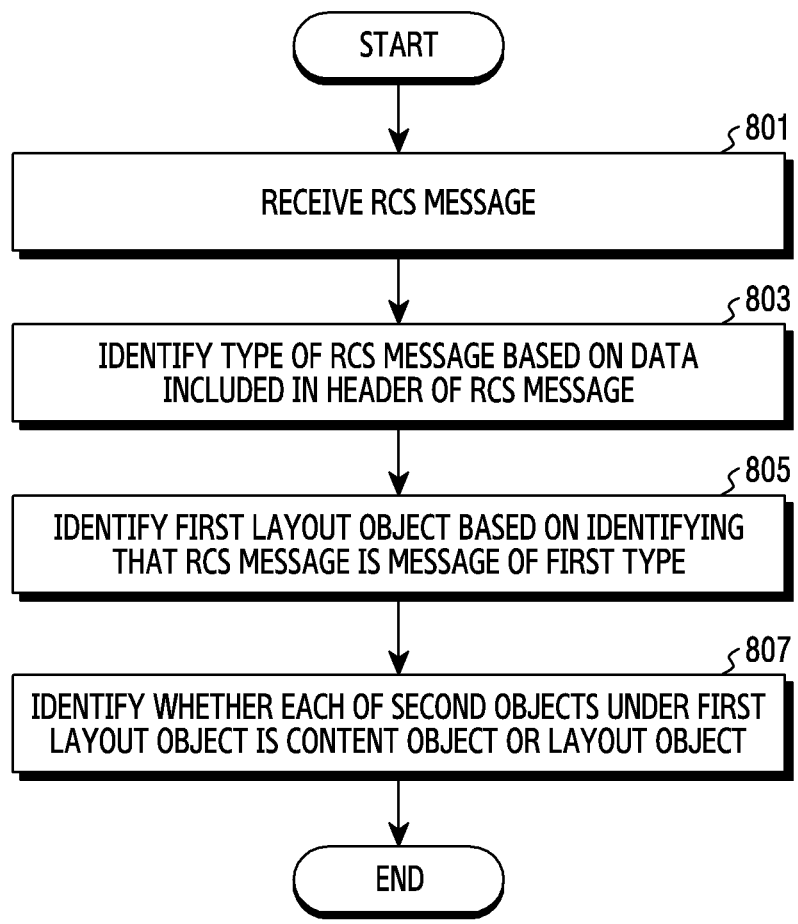
FIG. 8 is a flowchart illustrating an example method for processing an RCS message according to various embodiments.

FIG. 8 is a flowchart illustrating an example method for processing an RCS message according to various embodiments. This method may be performed by the processor 120 of the electronic device 101 shown in FIG. 1 or 2.

Referring to FIG. 8, in operation 801, the processor 120 of the electronic device 101 may receive an RCS message from an external device (for example, the first server 201-1, the first server 210-2, or the first server 210-3) through a communication circuit (for example, the communication module 190) of the electronic device 101. For example, the processor 120 may receive the RCS message using an application (for example, a message application) supporting the RCS, which is stored in the memory 130. In various embodiments, the external device may include a chatbot.

In operation 803, the processor 120 may identify a type of the RCS message based on data included in a header of the RCS message. For example, in response to the RCS message being received, the processor 120 may identify that the RCS message is the message of the first type or that the RCS message is the message of the second type, by analyzing the data (for example, a field of a content type) included in the header.

In operation 805, the processor 120 may identify a first layout object from the RCS message, based on identifying that the RCS message is the message of the first type. In various embodiments, the first layout object may refer, for example, to an object used to determine relative positions of objects under the first layout object. For example, the first layout object may include a field (or information) for arranging the objects horizontally, or may include a field for arranging the objects vertically.

In operation 807, the processor 120 may identify or determine whether each of the objects under the first layout object is a content object or a layout object. For example, the processor 120 may determine whether each of the objects is the content object or the layout object in order to display a plurality of contents provided by the RCS message. For example, the content object may refer to an object which is used to provide each of the plurality of contents. For example, the layout object may refer to an object which is used to determine relative positions of the plurality of contents. For example, the processor 120 may determine whether each of the objects is the content object or the layout object, by identifying whether a value in a designated field (for example, "widget") included in each of the objects is "linearlayout," "textivew," "imageview," or "suggestions."

The processor 120 may display the plurality of contents based on the relative positions identified based on the layout object, although this operation is not illustrated in FIG. 8.

The processor 120 may display the contents of the RCS message in the user interface in a pre-defined structure, based on it being identified that the RCS message is the message of the second type, although this operation is not illustrated in FIG. 8.

As described above, the electronic device 101 according to various embodiments may identify whether the RCS message is the message of the first type or the message of the second type, and, based on the RCS message being the message of the first type, the electronic device 101 may provide a dynamic layout message by analyzing objects in the RCS message, and, based on the RCS message being the message of the second type, the electronic device may provide a message of a pre-defined format. By performing these operations, the electronic device 101 according to various embodiments may provide an enhanced service (for example, a chatbot service).

Figure 9:
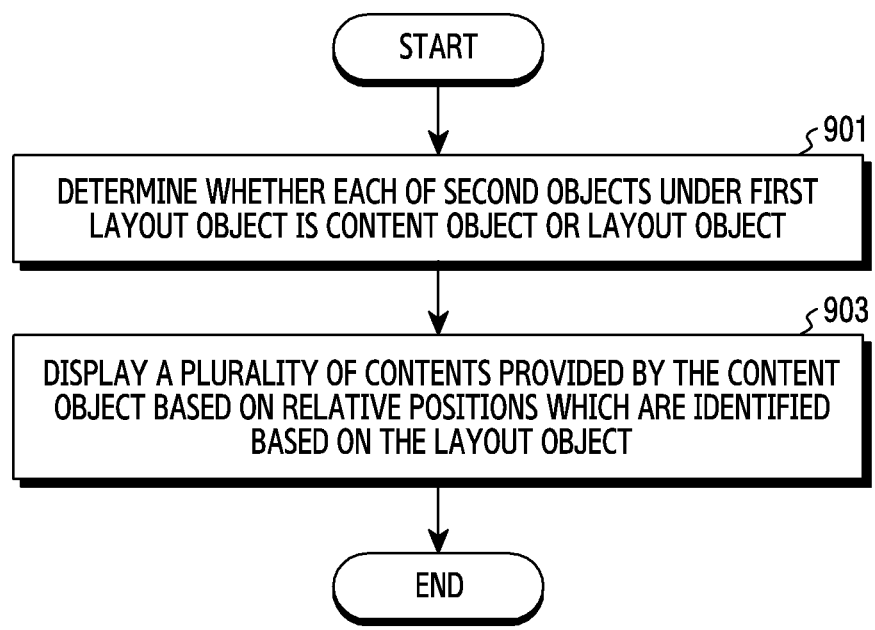
FIG. 9 is a flowchart illustrating an example method for displaying information regarding an RCS message according to various embodiments.

FIG. 9 is a flowchart illustrating an example method for displaying information regarding an RCS message according to various embodiments. This method may be performed by the processor 120 of the electronic device 101 shown in FIG. 1 or 2.

Referring to FIG. 9, in operation 901, the processor 120 of the electronic device 101 may determine whether each of second objects under a first layout object in a received RCS message is a content object or a layout object. For example, operation 901 may correspond to operation 807.

In operation 903, in response to the determination, the processor 120 may provide (or display) the plurality of contents arranged based at least on the relative positions in a user interface of an application that is configured to receive the RCS message. For example, the processor 120 may obtain information regarding arrangements of the second objects, based on the first layout object. In various embodiments, the processor 120 may obtain information regarding whether to arrange the second objects vertically or horizontally, based on an orientation of the first layout object. For example, the second processor 120 may identify a second layout object from among the second objects. The processor 120 may obtain information regarding arrangements of third objects under the second layout object based on the second layout object. In various embodiments, the processor 120 may obtain information regarding whether to arrange the third objects vertically or horizontally based on an orientation of the second layout object. In various embodiments, the processor 120 may display the plurality of contents based on the relative positions which are determined based at least on information regarding the arrangements of the second objects and information regarding the arrangements of the third objects.

As described above, the RCS message according to various embodiments can display contents in various arrangements without requiring change of a messaging client and a messaging server. For example, the RCS message can enhance expandability and compatibility of a service provided through a chatbot in the RCS. Since the RCS message is used to display contents in various arrangements, the RCS message may display contents according to a size or a type of the screen of the electronic device 101, a driving method of the electronic device 101. For example, the RCS message may display contents in an electronic device having a relatively small display such as a smart watch, by adjusting the structure of the RCS message. For example, since the RCS message includes executable objects such as the content object 463, the content object 466, and the content object 476, a service related to the RCS message can be provided by executing a web page even when there is no application related to the content object 463, the content object 466, and the content object 476 in the electronic device 101.

Figure 10:
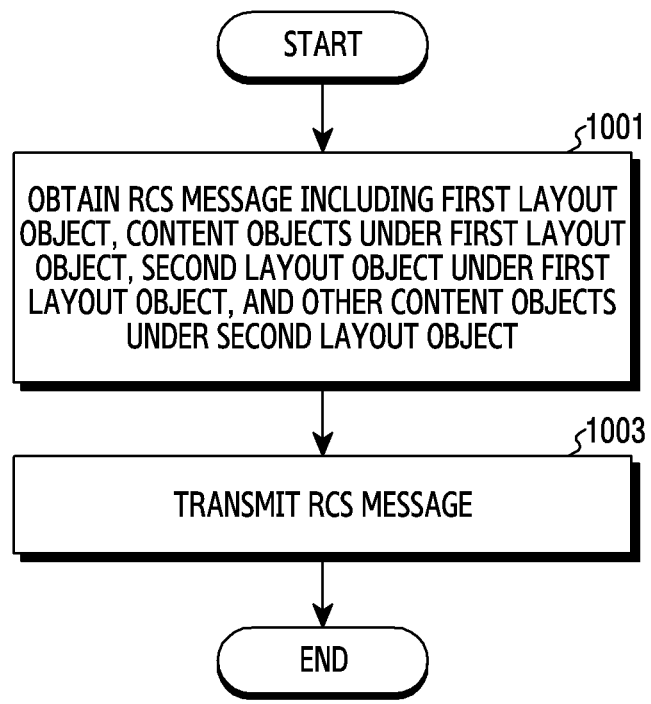
FIG. 10 is a flowchart illustrating an example method for transmitting an RCS message according to various embodiments.

FIG. 10 is a flowchart illustrating an example method for transmitting an RCS message according to various embodiments. This method may be performed by a processor of the first server (for example, the first server 210-1, the first server 210-2, or the first server 210-3) shown in FIG. 2.

Referring to FIG. 10, in operation 1001, the processor may obtain an RCS message which includes a first layout object, content objects under the first layout object, a second layout object under the first layout object, and other content objects under the second layout object. For example, the processor may obtain the RCS message to provide a chatbot service. For example, the content objects and the second layout object may have the same level. In some embodiments, an orientation of the first layout object may be distinct from an orientation of the second layout object. For example, the first layout object may be used to determine relative positions of the content objects, and the second layout object may be used to determine relative positions of the other content objects, and each of the content objects and the other content objects may be used to provide a plurality of contents of the RCS message. In various embodiments, the RCS message may further include a header including data for indicating that the RCS message is the message of the first type. In various embodiments, the first layout object, the content objects, the second layout object, and the other content objects may be included in a payload in the RCS message. In various embodiments, the content object may be configured with a text view or an image view.

In operation 1003, the processor may transmit the RCS message to an external device (for example, the electronic device 101) through a communication circuit of the first server. In various embodiments, the content objects may be displayed in arrangements determined based on the first layout object in the external device, and the other content objects may be displayed in arrangements determined based on the second layout object in the external device. In various embodiments, the RCS message may be transmitted to the external device through an RCS messaging server.

As described above, since the RCS message according to various embodiments includes the second layout object under the first layout object, the RCS message can display contents in various arrangements. According to various embodiments, the first server which transmits the RCS message transmits the RCS message for displaying the contents in various arrangements to the external device, such that the external device can provide an enhanced service (for example, an enhanced chatbot service).

A non-transitory computer readable storage medium according to various embodiments may store one or more programs including instructions. When being executed by one or more processors of an electronic device, the electronic device including a communication circuit, a display, at least one memory storing the instructions and an application supporting an RCS, the instructions may cause the electronic device to: receive an RCS message from an external device through the communication circuit using the application, identify that the RCS message is a first type based on data included in a header of the RCS message, identify a first layout object from the RCS message based on the identification, and, based on the identification of the first layout object, determine whether each of second objects under the first layout object is a content object used to provide each of a plurality of contents in a user interface of the application using the display, or a layout object indicating relative positions of the plurality of contents.

As described above, a non-transitory computer readable storage medium according to various embodiments may store one or more programs including instructions. When being executed by one or more processors of an electronic device including a communication circuit, the instructions may cause the electronic device to: obtain an RCS message including a first layout object, content objects under the first layout object, a second layout object under the first layout object, and other content objects under the second layout object; and transmit the obtained RCS message to an external device through the communication circuit. The first layout object may be used to determine relative positions of the content objects, the second layout object may be used to determine relative positions of the other content objects, and each of the content objects and the other content objects may be used to provide a plurality of contents of the RCS message.

Methods according to the present disclosure may be implemented in hardware, software, or a combination of hardware and software.

When implemented in software, a computer-readable storage medium storing one or more programs (software modules) may be provided. One or more programs stored on a computer-readable storage medium are configured for execution by one or more processors in an electronic device. One or more programs may include instructions that cause the electronic device to perform the methods in accordance with the embodiments of the present disclosure.

Such programs (software modules, software) may be stored in a computer readable medium such as a random access memory, a non-volatile memory including a flash memory, a ROM (Read Only Memory), an electrically erasable programmable ROM (EEPROM), a magnetic disc storage device, a compact disc-ROM (CD-ROM), a digital versatile disc (DVDs) An optical storage device, or a magnetic cassette. Or a combination of some or all of these. In addition, a plurality of memories may be included.

In addition, the program may be transmitted through a communication network including a communication network such as the Internet, an Intranet, a LAN (Local Area Network), a WLAN (Wide LAN), or a SAN (Storage Area Network) And can be stored in an attachable storage device that can be accessed. Such a storage device may be connected to an apparatus performing an embodiment of the present disclosure via an external port. Further, a separate storage device on the communication network may be connected to an apparatus performing the embodiments of the present disclosure.

In the various example embodiments of the present disclosure described above, the elements included in the disclosure have been represented singular or plural in accordance with the example embodiments shown. It should be understood, however, that the singular or plural representations are selected appropriately according to the situations presented for the convenience of description, and the present disclosure is not limited to the singular or plural constituent elements, and may be include a plurality of elements even if they are expressed.

While the disclosure has been illustrated described reference to various example embodiments, it is to be understood that the example embodiments are intended to be illustrative, not limiting. Therefore, one skilled in the art will understand that various changes in form and detail may be made without departing from the spirit and scope of the disclosure, including the appended claims and their equivalents.

What is claimed is:

1. An electronic device comprising:
a communication circuit;
a touch screen;
at least one memory configured to store an application supporting a rich communication service (RCS); and
at least one processor,
wherein the at least one processor is configured to control the electronic device to:
receive an RCS message from an external device through the communication circuit using the application;
identify whether the RCS message is a first type or a second type based on data included in a header of the RCS message;
identify a first layout object from the RCS message based on identifying that the message is the first type;
identify whether each of second objects under the first layout object is a content object or a layout object, wherein the layout objects indicates relative positions of a plurality of contents provided by the content object to be displayed on the touch screen; and
display the plurality of contents based on the relative positions identified based on the layout object.

2. The electronic device of claim 1, wherein the message of the first type comprises a message having an arrangement changeable based on the layout object, and
wherein the message of the second type comprises a message having a pre-defined arrangement.

3. The electronic device of claim 2, wherein the at least one processor is configured to control the electronic device to: display the plurality of contents horizontally or vertically based at least on the relative positions identified based on the layout object.

4. The electronic device of claim 3, wherein the at least one processor is further configured to control the electronic device to: identify that the RCS message is the message of the second type based on the data included in the header of the RCS message, and display the contents of the RCS message in a pre-defined structure, based on identifying that the RCS message is the message of the second type.

5. The electronic device of claim 1, wherein the at least one processor is configured to control the electronic device to identify that the RCS message is the message of the first type based on a field of a content type in the data in the header.

6. The electronic device of claim 1, wherein the message of the first type comprises data configured with a tree structure in a payload.

7. The electronic device of claim 1, wherein the external device comprises a chatbot server.

8. An electronic device comprising:
a memory configured to store instructions;
a communication circuit; and
at least one processor,
wherein the at least one processor is configured to execute the instructions to control the electronic device to: obtain a rich communication service (RCS) message comprising a first layout object, content objects under the first layout object, a second layout object under the first layout object, and other content objects under the second layout object, and transmit the obtained RCS message to an external device through the communication circuit,
wherein the first layout object is usable to determine relative positions of the content objects,
wherein the second layout object is usable to determine relative positions of the other content objects,
wherein each of the content objects and the other content objects is usable to provide a plurality of contents of the RCS message.

9. The electronic device of claim 8, wherein the RCS message further comprises a header comprising data indicating that the RCS message is a message of a first type.

10. The electronic device of claim 8, wherein the first layout object is usable to display contents provided by the content objects horizontally or vertically in the external device.

11. The electronic device of claim 8, wherein the relative positions of the content objects are determined by a field of an orientation of the first layout object, and
wherein the relative positions of the other content objects are determined by a field of an orientation of the second layout object.

12. The electronic device of claim 8, wherein the RCS message is configured to be transmitted to the external device through an RCS messaging server.

13. The electronic device of claim 8, wherein the first layout object, the content objects, the second layout object, and the other content objects are included in a payload in the RCS message.

14. The electronic device of claim 8, wherein the content object is configured with a text view or an image view.

15. A non-transitory computer readable storage medium comprising one or more programs including instructions, wherein, when being executed by an electronic device including a touch screen, a communication circuit and at least one memory configured to store an application supporting a rich communication service (RCS), the instructions cause the electronic device to:
receive an RCS message from an external device through the communication circuit using the application;
identify whether the RCS message is a first type or a second type based on data included in a header of the RCS message;
identify a first layout object from the RCS message based on identifying that the message is the first type;
identify whether each of second objects under the first layout object is a content object or a layout object, wherein the layout object indicates relative positions of a plurality of contents provided by the content object to be displayed on the touch screen; and
display the plurality of contents based on the relative positions identified based on the layout object.

16. The non-transitory computer readable storage medium of claim 15, wherein the message of the first type comprises a message having an arrangement changeable based on the layout object, and
wherein the message of the second type comprises a message having a pre-defined arrangement.

17. The non-transitory computer readable storage medium of claim 16, wherein the one or more programs include instructions that, when executed, cause the electronic device to display the plurality of contents horizontally or vertically based at least on the relative positions.

18. The non-transitory computer readable storage medium of claim 17, wherein the one or more programs include instructions that, when executed, cause the electronic device to: identify that the RCS message is the message of the second type based on the data included in the header of the RCS message, and display the contents of the RCS message in a pre-defined structure based on identifying that the RCS message is the message of the second type.

19. The non-transitory computer readable storage medium of claim 15, wherein the one or more programs include instructions that, when executed, cause the electronic device to identify that the RCS message is the message of the first type based on a field of a content type in the data in the header.

20. The non-transitory computer readable storage medium of claim 15, wherein the message of the first type comprises data configured with a tree structure in a payload.

* * * * *